(12) United States Patent
Maus et al.

(10) Patent No.: US 7,799,734 B2
(45) Date of Patent: Sep. 21, 2010

(54) CATALYST CARRIER BODY FOR A CATALYTIC CONVERTER TO BE INSTALLED CLOSE TO AN ENGINE, CATALYTIC CONVERTER, EXHAUST SYSTEM AND VEHICLE HAVING THE CATALYST CARRIER BODY

(75) Inventors: Wolfgang Maus, Bergisch Gladbach (DE); Rolf Brück, Bergisch Gladbach (DE)

(73) Assignee: Emitec Gesellschaft fur Emissionstechnologie mbH, Dusseldorf (DE)

( * ) Notice: Subject to any disclaimer, the term of this patent is extended or adjusted under 35 U.S.C. 154(b) by 18 days.

(21) Appl. No.: 11/601,955

(22) Filed: Nov. 20, 2006

(65) Prior Publication Data

US 2007/0065350 A1   Mar. 22, 2007

Related U.S. Application Data

(63) Continuation of application No. PCT/EP2005/004678, filed on Apr. 29, 2005.

(30) Foreign Application Priority Data

May 19, 2004   (DE) ...................... 10 2004 024 685

(51) Int. Cl.
  *B01J 32/00* (2006.01)
  *F01N 3/24* (2006.01)
  *F01N 13/16* (2006.01)

(52) U.S. Cl. .................. 502/439; 502/337; 60/274; 60/299; 422/177; 422/180

(58) Field of Classification Search .................. 60/274, 60/299; 422/180, 177; 502/337, 439
See application file for complete search history.

(56) References Cited

U.S. PATENT DOCUMENTS 4,152,302 A   5/1979   Nonnenmann et al.

(Continued)

FOREIGN PATENT DOCUMENTS

CN   1224638 A   8/1999

(Continued)

OTHER PUBLICATIONS

Avallone, E.A.; Baumeister, T., III (1996). Marks' Standard Handbook for Mechanical Engineers (10th Edition). (pp. 6-78 and 6-90). McGraw-Hill. Online version available at: http://knovel.com/web/portal/browse/display?_EXT_KNOVEL_DISPLAY_bookid=346&VerticalID=0 (relevant pages attached).*

*Primary Examiner*—Timothy C Vanoy
*Assistant Examiner*—Diana J Liao
(74) *Attorney, Agent, or Firm*—Laurence A Greenberg; Werner H Stemer; Ralph E Locher

(57) ABSTRACT

A catalyst carrier body, which is suitable for use in an exhaust system close to an internal combustion engine, has a multiplicity of passages through which a gas stream can flow and which extend next to one another between an inlet side and an outlet side. In order to allow efficient and permanent installation of an exhaust-gas treatment device, which can be subjected to high thermal and dynamic loads, the catalyst carrier body has at least one metallic sheet, which at a temperature of 900° C. at least has a proof stress $R_{p0.2}$ of 50 N/mm². A catalytic converter, which is likewise suitable for this purpose, a corresponding exhaust system and a corresponding vehicle, are also provided.

14 Claims, 2 Drawing Sheets

U.S. PATENT DOCUMENTS

| | | | |
|---|---|---|---|
| 4,859,433 A * | 8/1989 | Pereira et al. | 423/212 |
| 5,157,010 A | 10/1992 | Maus et al. | |
| 5,413,767 A | 5/1995 | Breuer et al. | |
| 5,426,084 A * | 6/1995 | Fukaya et al. | 502/439 |
| 5,447,773 A | 9/1995 | Usui | |
| 5,506,028 A * | 4/1996 | Bruck | 428/116 |
| 5,534,476 A * | 7/1996 | Luoma et al. | 502/335 |
| 6,500,393 B2 | 12/2002 | Nakamori et al. | |
| 6,651,424 B1 * | 11/2003 | Twigg | 60/289 |
| 6,660,235 B1 | 12/2003 | Holpp et al. | |
| 2001/0016266 A1 | 8/2001 | Okazaki et al. | |
| 2002/0043314 A1 * | 4/2002 | Eto | 148/621 |
| 2003/0072694 A1 | 4/2003 | Hodgson et al. | |
| 2003/0086837 A1 * | 5/2003 | Bruck et al. | 422/180 |
| 2004/0074231 A1 | 4/2004 | Bruck | |
| 2006/0166029 A1 * | 7/2006 | Inaguma et al. | 428/653 |

FOREIGN PATENT DOCUMENTS

| | | |
|---|---|---|
| CN | 1429130 A | 7/2003 |
| CN | 1147663 C | 4/2004 |
| DE | 27 33 640 A1 | 2/1979 |
| DE | 38 38 295 A1 | 5/1989 |
| DE | 89 00 467.1 | 5/1990 |
| DE | 42 34 931 A1 | 4/1994 |
| DE | 42 28 266 A1 | 5/1994 |
| DE | 44 03 498 A1 | 8/1994 |
| DE | 93 17 050.5 | 3/1995 |
| DE | 199 00 148 A1 | 7/1999 |
| DE | 198 30 342 C1 | 11/1999 |
| EP | 0 289 943 A2 | 1/1989 |
| GB | 2 214 414 A | 7/1989 |
| WO | WO 97/21489 | 6/1997 |
| WO | WO 02/083274 A1 | 10/2002 |
| WO | WO 2004046406 * | 3/2004 |

* cited by examiner

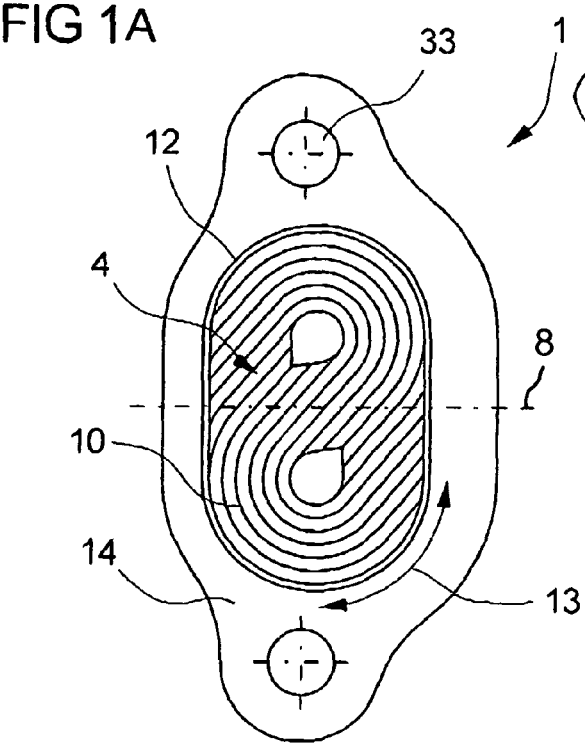
FIG 1A
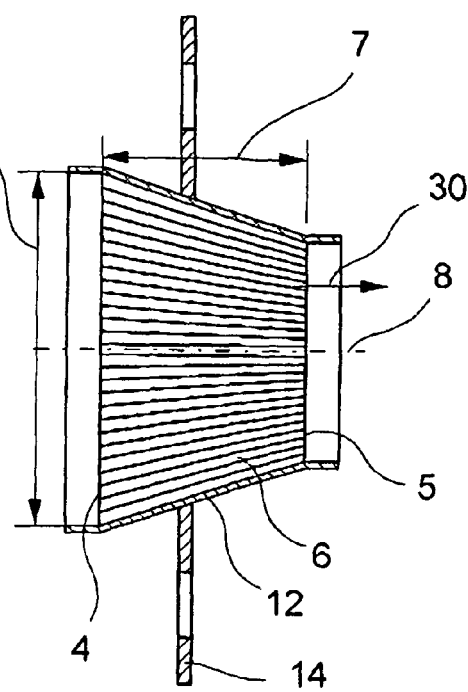
FIG. 1B
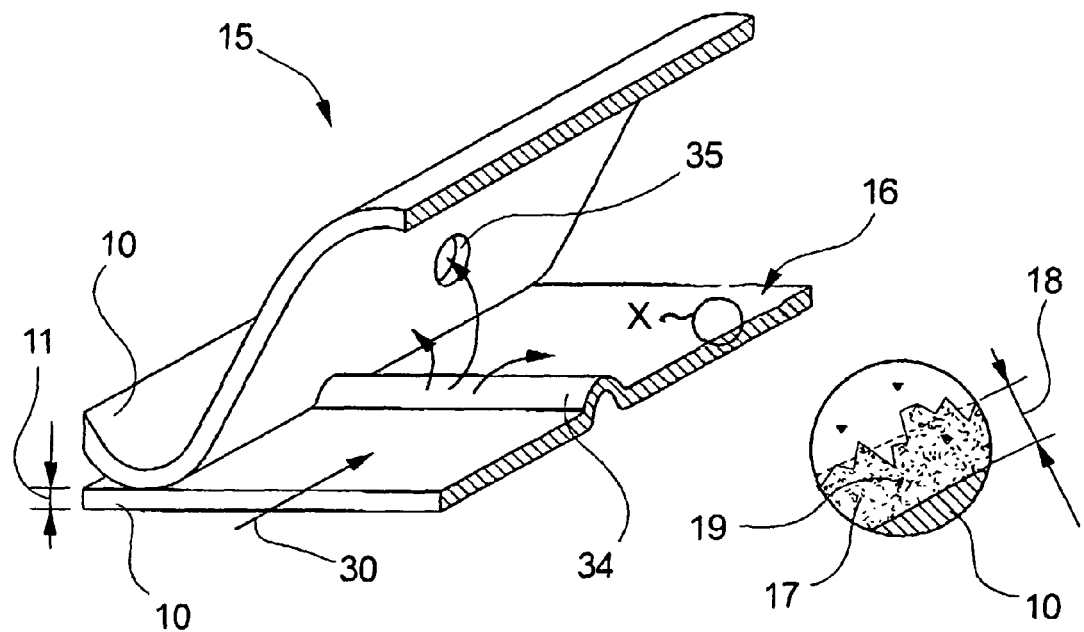
FIG 2A
FIG. 2B

CATALYST CARRIER BODY FOR A CATALYTIC CONVERTER TO BE INSTALLED CLOSE TO AN ENGINE, CATALYTIC CONVERTER, EXHAUST SYSTEM AND VEHICLE HAVING THE CATALYST CARRIER BODY

CROSS-REFERENCE TO RELATED APPLICATIONS

This is a continuation, under 35 U.S.C. §120, of copending international application No. PCT/EP2005/004678, filed Apr. 29, 2005, which designated the United States; this application also claims the priority, under 35 U.S.C. §119, of German patent application No. DE 10 2004 024 685.8, filed May 19, 2004; the prior applications are herewith incorporated by reference in their entirety.

BACKGROUND OF THE INVENTION

Field Of The Invention

The invention relates to a catalyst carrier body, which is suitable for use in an exhaust system close to an internal combustion engine. The invention also relates to a catalytic converter, which is likewise suitable for this purpose, a corresponding exhaust system and a corresponding vehicle.

Due to increasing environmental awareness, with the associated statutory provisions, which are placing ever higher demands on exhaust systems used in automotive engineering, the exhaust systems of automobiles have been the subject of constant and ongoing development in the past. By now, a wide range of components which each perform different functions within the exhaust system have been developed. By way of example, it is known to use starting catalytic converters, which have a particularly small volume and therefore reach their starting temperature required for catalytic conversion soon after a cold start on the part of the internal combustion engine. Furthermore, by way of example, it is known to use electrically heatable catalytic converters, which likewise improve the cold-start performance of the exhaust system. What are known as adsorbers in the exhaust system of an internal combustion engine serve the purpose of adsorbing certain pollutants contained in the exhaust gas for a certain period of time. Those pollutants are then stored until, for example, a downstream catalytic converter has reached its operating temperature and can finally begin to convert the pollutants, which then begin to be desorbed. Moreover, particulate traps or particulate filters, which trap carbon particulates or other solids contained in the exhaust system, are used in particular in exhaust systems of diesel engines, with the accumulations of particulates which are trapped being continuously or discontinuously converted into gaseous constituents, for example by a high thermal energy or suitable additives being supplied.

In order to purify the exhaust gas as efficiently as possible, the various components are combined in series in a suitable way, so that by now a plurality of components of that type are provided in an exhaust system of an automobile. However, the components disposed upstream have an increasing influence on the efficiency or conversion capacity of the downstream exhaust-gas treatment components. That system becomes increasingly unstable in particular given the frequent fluctuations in compositions or states (pressure, temperature, distribution, flow velocity) of the exhaust gas. In addition, technical difficulties arise in connection with the installation of turbochargers, measures for adding additives, etc. Temperature management of the exhaust gas is also of considerable importance, since the catalyst substances, which are provided in each case, always only have a limited temperature range in which they are active, and in that context it is also necessary to compensate for the difficulties of fluctuations in the exhaust-gas temperature. Cold-starting phases and/or idling phases of the engine still continue to present problems, since during those phases the exhaust-gas treatment components and/or the exhaust gas in some cases cool down to temperatures which no longer ensure immediate conversion of all of the pollutants directly after the new load phase of the internal combustion engine has started. In addition, all of the exhaust-gas treatment components are exposed to considerable and fluctuating thermal and dynamic loads during operation, and consequently particular demands have to be imposed on the durability of components of that type.

An example of an exhaust system of that type is described in International Publication No. WO 02/083274, corresponding to U.S. Patent Application Publication No. US 2004/0074231. That exhaust system has already proven very successful in the past, although tests have shown the considerable influence of the type and effect of the starting catalytic converter on the efficiency of the downstream exhaust-gas treatment components.

SUMMARY OF THE INVENTION

It is accordingly an object of the invention to provide a catalyst carrier body for a catalytic converter to be installed close to an engine, a catalytic converter, an exhaust system and a vehicle having the catalyst carrier body, which overcome the hereinafore-mentioned disadvantages of the heretofore-known devices of this general type and which at least partially improve the known exhaust systems in terms of their functionality and/or efficiency. In particular, the known technical problems are to be at least alleviated. A primary objective is to provide a catalyst carrier body for a catalytic converter, which is suitable for use in an exhaust system close to an internal combustion engine. The configuration of the catalyst carrier body and/or of the ultimately coated catalytic converter is to be improved in such a manner that the function and efficiency of downstream components is not adversely affected to a significant extent. Moreover, the catalyst carrier body as well as the catalytic converter are to be able to withstand the high thermal and dynamic loads in the exhaust system of an internal combustion engine for a prolonged period of time.

With the foregoing and other objects in view there is provided, in accordance with the invention, a catalyst carrier body for use in an exhaust system close to an internal combustion engine. The catalyst carrier body comprises an inlet side for a gas stream and an outlet side for the gas stream. At least one metallic sheet is disposed between the inlet side and the outlet side. The at least one metallic sheet has at least a proof stress $R_{p0.2}$ of 50 N/mm² (Newtons per square millimeter) at a temperature of 900° C. (degrees Celsius). A multiplicity of passages are provided through which the gas stream can flow. The passages are formed by the at least one metallic sheet and extend next to one another between the inlet side and the outlet side. A device is provided at least for maintaining or generating a turbulent flow of the gas stream through the passages.

The term "catalyst carrier body" is to be understood as meaning a structure which is suitable for a catalytically active coating to be applied to. The catalyst carrier body usually has a very large surface area per unit volume, in order to make contact between the gas stream and the coating on the surface as intimate as possible. Catalyst carrier bodies of this type are often referred to as honeycomb bodies, due to their passage structure. They may be of single-part or multi-part construction. Catalyst carrier bodies made from metallic materials and from ceramic are known. Metallic catalyst carrier bodies usually have a plurality of at least partially structured sheet-steel layers, which are joined together, in particular by welding or brazing, to form a honeycomb body of this type. Ceramic honeycomb bodies are usually extruded or sintered.

The term "close to" an internal combustion engine is to be understood in particular as meaning that a catalyst carrier body of this type is located at a distance of less than 50 cm from the exhaust of the combustion chamber of the internal combustion engine. It is preferable for a catalyst carrier body of this type to be positioned even closer to the combustion chamber or internal combustion engine, for example at a distance of less than 20 cm, and even for a catalyst carrier body of this type to at least partially project into the inner region of the internal combustion engine. It is very particularly preferred for a catalyst carrier body of this type to be positioned in a region between the internal combustion engine and what is known as the manifold, which describes the subsections of the exhaust pipe which run from the individual combustion chambers to a combined exhaust pipe.

If a catalyst carrier body is suitable for being disposed close to an internal combustion engine, it is necessary in particular to take into account the pressure conditions which prevail there and the temperature fluctuations which occur. Extremely high temperatures, in particular up to 1000° C. or even above, occur in these regions. Moreover, it should be borne in mind that in this case, immediately downstream of the combustion chambers, the pulsed exhaust gases, which result from the combustion of the fuel mix and continue in the exhaust pipe, act particularly directly on the catalyst carrier body. It should also be taken into account that at the time at which the exhaust gas is discharged, there is in some cases still a considerable level of unburnt hydrocarbons in the exhaust gas, which due to a catalytically active coating on the catalyst carrier body leads to "afterburning" in the interior of the catalyst carrier body, so that even higher temperature peaks may be reached under certain circumstances. Depending on the position of the hydrocarbons in the exhaust gas, these peaks form at various locations of the catalyst carrier body, so that what are known as "hot spots" are in each case formed at various locations, leading to different levels of thermal load on the catalyst carrier body over its cross section and/or its volume. In view of all of these factors, clearly not all of the known catalyst carrier bodies are suitable for this use. The following text provides a more detailed explanation of the particular features of the catalyst carrier body, which is present herein.

The passages in the catalyst carrier body through which the exhaust gas can flow are generally rectilinear. In particular, the passages run substantially parallel to one another and even also parallel to a center axis of the catalyst carrier body. This enables the catalyst carrier body to produce a low dynamic pressure. An undesirably high dynamic pressure can lead to altered pressure conditions in the combustion chamber and would therefore reduce the engine power.

As the exhaust gas is expelled from the combustion chambers, a turbulent flow is usually formed. Given the close configuration of a catalyst carrier body of this type, it can often be assumed, if appropriate also as a function of the operating state of the internal combustion engine, that the gas stream or the exhaust gas will impinge on the catalyst carrier body or its inlet side with turbulent flow properties. Tests on which the invention is based have in fact revealed that it is advantageous for the downstream exhaust-gas treatment components if this turbulent flow is maintained or is generated by the catalyst carrier body. Consequently, the catalyst carrier body includes a device for maintaining and/or generating a turbulent flow of the exhaust-gas stream through the passages. A "device" of this type includes in particular a corresponding configuration of the passage cross sections and/or the passage length. The passages may preferably be constructed at least in part with microstructures or obstacles which locally produce a pressure difference with respect to the gas stream flowing through, so that this pressure difference upstream and next to the obstacle or microstructure becomes so great that swirling, etc. is formed downstream thereof. This swirling flow then continues onward in the direction of flow, due to the angular momentum being maintained.

In this context, the Reynolds number, which is effected by the device and is produced during flow through the catalyst carrier body or the catalytic converter, is also of particular importance. The Reynolds number is the quotient of double the kinetic energy of the moving gas volume and the frictional energy consumed during the movement. The Reynolds number is therefore a measure of whether a flow is laminar or turbulent. If the kinetic energy is lower than the frictional energy, the flow is laminar. If the kinetic energy is higher, i.e. in particular at high flow velocity, the flow is transformed into a turbulent flow or the turbulent flow is maintained. The kinetic energies which in each case arise in the exhaust-gas stream and/or the flow velocities which arise are not usually constant during operation of an internal combustion engine, with the result that, for example under load, high flow velocities or kinetic energies are provided in the exhaust-gas stream, whereas in breaks between high load levels or in idling periods the exhaust-gas stream has only a low kinetic energy. It is preferable for the catalyst carrier body to be configured in such a way that it at least maintains the turbulent flow during the load phases and if necessary produces it during the resting phases.

According to the invention, the catalyst carrier body is constructed of at least one metallic sheet. The metallic sheet, at a temperature of 900° C., at least has a proof stress $R_{p0.2}$ of 50 N/mm². This expresses the fact that the metallic sheet used has a particularly high strength at high temperatures. The proof stress $R_{p0.2}$ is advantageously even at least 75 N/mm².

The proof stress $R_{p0.2}$ describes the stress at which, after the load on a tensile specimen has been relieved, a permanent elongation of 0.2% is recorded. The proof stress usually represents a type of substitute yield strength for materials which do not have a sudden yield point. In order to determine the proof stress, a tensile specimen is subjected to load in the axial direction at the temperature given herein of 900° C. The force is increased to an ever greater extent, with a stress-strain diagram being recorded. Various strength and deformation characteristic variables of the materials can be determined on the basis of this stress-strain diagram. This curve is substantially distinguished by an elastic deformation, referred to as the Hookes curve, and a curve part, which distinguishes the plastic flow of the material or tensile specimen. Determination of the 0.2% proof stress ($R_{p0.2}$) is a basic principle of materials science, which can be considered to be known.

It is particularly advantageous if a tensile test is carried out in a similar way using the honeycomb body constructed from metallic sheets, with the honeycomb body itself, after the joining process, i.e. after the welding or high-temperature brazing of the metallic sheets to one another, having a proof stress $R_{p0.2}$ of at least 50 N/mm² or even at least 75 N/mm². In particular in this case, it is possible to use a reduced sheet thickness, for example a sheet thickness of from 40 μm to 65 μm. The reduced sheet thickness in turn leads to an improved light-off performance on the part of a corresponding catalytic converter, since the latter presents a lower heat capacity and can therefore react more quickly to dynamic temperature changes.

In accordance with another feature of the invention, it is advantageous if the catalyst carrier body is constructed by using at least one metallic sheet, which is formed from an iron material, in which nickel is provided as the largest alloying constituent.

In accordance with a further feature of the invention, it is particularly preferable for the alloying constituent nickel to be in a range of from 30% by weight to 34% by weight.

Accordingly, the iron-based material includes, for example, between 30% by weight and 34% by weight of nickel and if appropriate between 18% by weight and 22% by weight of chromium as alloying constituents. This produces a material which is particularly able to withstand the thermal and corrosive environmental conditions in the exhaust system of mobile internal combustion engines.

In accordance with an added feature of the invention, the catalyst carrier body has a length in the direction of an axis and a maximum diameter, with the ratio of length to maximum diameter being at most 1 [L/D≦1]. In particular, if the catalyst carrier body is configured with passages running parallel to the axis, the length of the catalyst carrier body corresponds to the length of the passages. The term diameter is to be understood as meaning the maximum extent of the catalyst carrier body perpendicular to the axis. In this context, the term "diameter" applies not just to circular cross sections of the catalyst carrier body. A "maximum" diameter may be present if the cross section of the catalyst carrier body is constant in the direction of the axis that is not itself rotationally symmetrical. Examples include polygonal, oval or similar cross-sectional shapes. Moreover, it is also possible for the cross-sectional shape to be constant but for the surface area to be made variable in the direction of the axis. In this case, the maximum diameter is the diameter located in the cross-sectional area, which includes the largest surface area. It is preferable for the maximum diameter to approximately correspond to an exhaust port of the internal combustion engine or the cross section of the manifold. By way of example, the maximum diameters are preferably in a range of less than 50 mm (millimeters), in particular less than 30 mm. The length of the catalyst carrier body is to be correspondingly reduced. This ensures that the exhaust gas or the gas stream is only passed through the narrow passages over a relatively short distance, and consequently friction only acts on the respective partial gas streams over a short distance. Consequently, the ratio given herein for the length to the maximum diameter represents a way of maintaining a turbulent flow of the gas stream through the passages. Although the ratio given is advantageous in particular for integration of the catalyst carrier body, it is also possible to use different ratios elsewhere.

In accordance with an additional feature of the invention, the catalyst carrier body has a passage density in the range of from 50 cpsi to 600 cpsi (cells per square inch). Catalyst carrier bodies with a passage density of from 150 cpsi to 400 or 250 cpsi are preferred. The passage density describes a parameter of the catalyst carrier body, which in particular describes the ratio of surface area to volume as well as the flow resistance produced. The term "passage density" is to be understood as meaning the number of passages which are present in a unit of the cross-sectional area of the catalyst carrier body. The unit "cpsi" has gained widespread acceptance in specialist circles. 1 cpsi (cell per square inch) approximately corresponds to 6.4516 passages per square centimeter. The passage density given herein is relatively low and means that relatively large exhaust-gas partial-streams are passed through the passages. The result of this is that the turbulent flow within the passage can be maintained for a prolonged period of time.

In accordance with yet another feature of the invention, the catalyst carrier body is constructed by using at least one metallic sheet which has a sheet thickness of at least 30 μm (micrometers). The catalyst carrier body is advantageously constructed by using a plurality of at least partially structured metallic sheets, which are stacked or wound in such a way as to form a honeycomb body with passages disposed parallel to one another. The metallic sheet is formed of a material that is able to withstand high temperatures and is resistant to corrosion. The sheet thickness is relatively great and is selected by taking into account the high thermal and dynamic loads prevailing in the area of use. The sheet thickness is advantageously between 50 μm and 80 μm.

In accordance with yet a further feature of the invention, the inlet side of the catalyst carrier body is larger than its outlet side. It is preferable for a catalyst carrier body of this type to be conical in shape. In this case, the cross section of the passages is in particular not constant, but rather the passages function as a type of confusor. This narrowing of the cross section leads to a more tightly bundled gas stream upon leaving the catalyst carrier body. This is particularly advantageous above or upstream of a turbocharger, since in this case a targeted and bundled supply of the gas stream toward the smaller flow cavities of the turbocharger is made possible.

In accordance with yet an added feature of the invention, the catalyst carrier body has a housing, which includes at least one collar element in the direction of the circumference. This collar element is used to position and/or fix the catalyst carrier body in the exhaust system or at or in the internal combustion engine. The collar element is preferably constructed to continue all the way around in the circumferential direction and may under certain circumstances be connected to further housings of catalyst carrier bodies of similar configuration. It is preferable for the collar element to extend perpendicular to the axis of the catalyst carrier body, and in particular to be disposed centrally or on at least one of the end sides. The collar element may be part of the housing itself, but it is preferable for the collar element to be a separate component joined to the housing of the catalyst carrier body, for example by welding. The collar element may also have bores, which allow a releasable connection of the collar element to the exhaust system and/or the internal combustion engine. This ensures that it can be used as a replacement or additional part in corresponding exhaust systems having catalyst carrier bodies of this type.

With the objects of the invention in view, there is also provided a catalytic converter, comprising a catalyst carrier body according to the invention. The catalyst carrier body has a catalytically active coating.

In this context, it is preferable to use coatings which begin to convert pollutants contained in exhaust gases even at relatively low temperatures, for example at temperatures of approximately 200° C.

In accordance with another feature of the invention, the coating includes a support substance, into which the catalyst substance is impregnated. The support substance that is used is preferably what is known as a wash coat, which is substantially based on aluminum oxide. The wash coat provides a fissured and porous support substance that ensures intimate contact with the exhaust gas. The catalyst substance is then applied into or onto the wash coat. The catalyst substance, by way of example, includes small particles of precious metals, e.g. platinum, palladium or rhodium, and/or combinations of a plurality of precious metals and/or rare earths. The composition and structure of the wash coat or catalyst substance is selected in such a way that the exhaust gas interacts with the coating, thereby triggering or greatly accelerating chemical conversion into harmless substances.

In accordance with a further feature of the invention, the coating includes a support substance which has a layer thickness in the range of from 10 µm to 30 µm (micrometers). The term support substances is to be understood in particular as meaning the wash coat described above. The layer thickness constitutes a mean value. If the layer thickness, by way of example, varies over the length of the catalyst carrier body or of the catalytic converter, the layer thickness indicated herein is to be regarded as an upper limit, in particular the 30 µm limit. The layer thickness proposed herein is relatively thin and is the basis for strong bonding to the catalyst carrier bodies. At greater layer thicknesses, the huge thermal and dynamic loads cause the support substance and/or coating to become at least partially detached, and consequently the efficiency of the catalytic converter would drop rapidly over the course of time. Moreover, the detached parts would cause damage and disruption to the downstream exhaust-gas treatment components. This is prevented or reduced to a considerable extent herein by the low layer thickness being used.

In accordance with an added feature of the invention, the coating includes a catalyst substance, which promotes conversion of CO (carbon monoxide) but does not convert HC (hydrocarbons). This produces what is known as "selectivity" on the part of the coating. This means in other words that the coating only acts on and converts, i.e. transforms into other constituents, very specific pollutant components in the gasstream or exhaust gas. It is now proposed that the catalytically active coating, on one hand, promote or effect conversion of carbon monoxide into carbon dioxide, but on the other hand, allow hydrocarbons contained in the gas stream or exhaust gas to flow past it substantially without any chemical change. The hydrocarbons are converted in one of the exhaust-gas treatment components connected downstream in the exhaust system.

By way of example, the hydrocarbons help to regenerate downstream particulate filters, upstream of which there is positioned an oxidation catalytic converter for converting hydrocarbons of this type. The oxidation catalytic converter is responsible for combustion of the hydrocarbons, thereby producing an elevated temperature in the exhaust gas, which is ultimately responsible for thermal regeneration or conversion of carbon particulates that have accumulated in the particulate filter. These hydrocarbons are also suitable for the conversion of stored nitrogen oxides in a downstream adsorber.

Due to the fact that the catalytic converter described herein allows the unburnt hydrocarbons to pass through it, it is possible to dispense with separate fuel injection upstream of the oxidation catalytic converter or the adsorber or with the production of large quantities of unburnt hydrocarbons through the use of the internal combustion engine (which cannot be completely converted through the use of the catalytic converter). This ultimately even results in advantages with regard to the fuel consumption in internal combustion engines of this type.

With the objects of the invention in view, there is additionally provided an exhaust system for an internal combustion engine. The exhaust system comprises a turbocharger and a catalytic converter according to the invention. The catalytic converter is disposed between the internal combustion engine and the turbocharger.

An exhaust-gas turbocharger of this type is generally used to increase the power of the internal combustion engine. A turbine wheel in the interior of the turbocharger is driven by the exhaust gases. This turbine wheel is seated on a common shaft with what is known as a compressor impellor, which compresses the intake air for the internal combustion engine and passes it to the engine. Turbochargers of this type are in particular also used in combination with diesel engines. As has already been stated above, a catalyst carrier body, which is conical in form, i.e. in which the inlet side is larger than the outlet side, is particularly suitable for this purpose. As a result, the inflow properties of the exhaust gas are expediently configured in such a way that the turbocharger can have a very compact structure. In principle, it should also be noted that under certain circumstances a plurality of turbochargers may be provided in an exhaust system of this type. It is proposed herein that a catalytic converter of the configuration in accordance with the invention be connected upstream of at least one of these turbochargers.

In accordance with another feature of the invention, at least one of the following exhaust-gas treatment components is disposed downstream of the turbocharger: oxidation catalytic converter, particulate filter, nitrogen oxide adsorber. This results in particular advantages with regard to the use of a catalytic converter with a selective coating. Reference is made in particular to the content of International Publication No. WO 02/083274, corresponding to U.S. Patent Application Publication No. US2004/0074231, which is incorporated herein in its entirety, for details as to the configuration of oxidation catalytic converters, particulate filters and nitrogen oxide adsorbers of this type.

With the objects of the invention in view, there is concomitantly provided a vehicle, comprising a catalytic converter or an exhaust system according to the invention as described above. The term "vehicle" is to be understood in particular as meaning passenger automobiles and trucks.

Other features which are considered as characteristic for the invention are set forth in the appended claims.

Although the invention is illustrated and described herein as embodied in a catalyst carrier body for a catalytic converter to be installed close to an engine, a catalytic converter, an exhaust system and a vehicle having the catalyst carrier body, it is nevertheless not intended to be limited to the details shown, since various modifications and structural changes may be made therein without departing from the spirit of the invention and within the scope and range of equivalents of the claims, noting that all of the features recited individually in the claims can be combined with one another in any technologically appropriate way, thereby demonstrating further configurations of the invention.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 1A and 1B are respective diagrammatic, front-elevational and sectional views of an exemplary embodiment of a catalyst carrier body;

FIG. 2A is a fragmentary, perspective view of a portion of an exemplary embodiment of a catalytic converter;

FIG. 2B is an enlarged view of a portion X of FIG. 2A;

DESCRIPTION OF THE PREFERRED EMBODIMENTS

Figure 3:
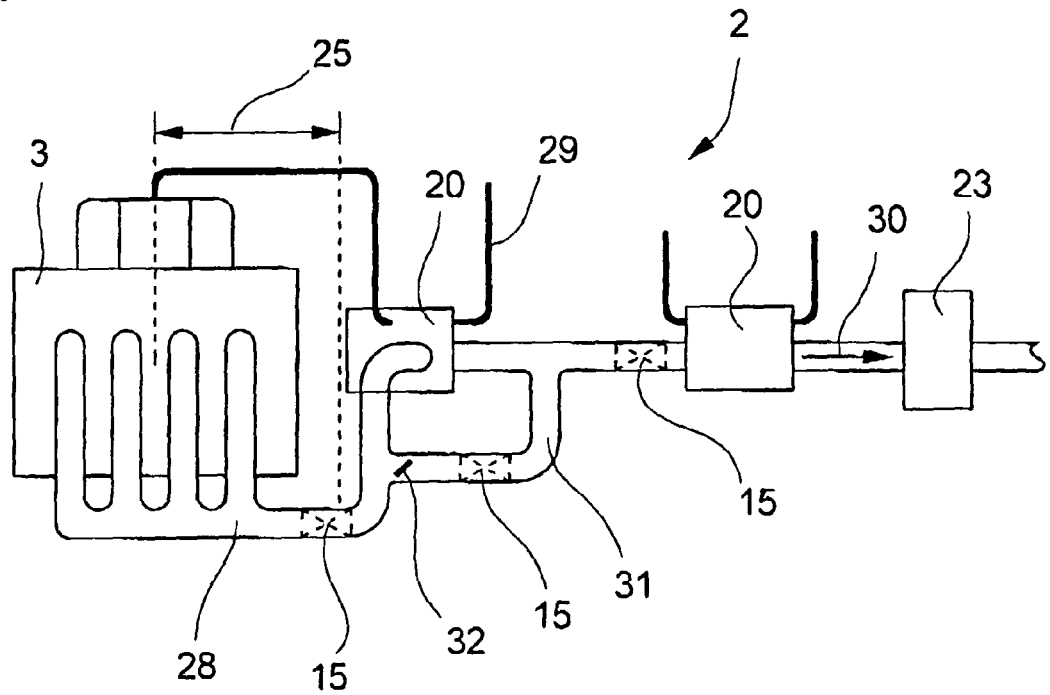
FIG. 3 is an illustration of a structure of an exhaust system.

Referring now to the figures of the drawings in detail and first, particularly, to FIGS. 1A and 1B thereof, there are seen two views of an exemplary embodiment of a catalyst carrier body 1 which is suitable for use in an exhaust system close to an internal combustion engine. FIG. 1A shows a front view of a catalyst carrier body 1 from its inlet side 4. FIG. 1B illustrates a cross section through the catalyst carrier body 1.

It can be seen from FIG. 1A that the catalyst carrier body 1 includes a plurality of metallic sheets or foils 10, which are intertwined substantially in an S shape and are disposed in a housing 12. The sheets 10 form two larger openings (winding holes) formed as a result of the winding of the sheets 10. The sheets 10 are made from a material which is able to withstand high temperatures and is resistant to corrosion. The material has particularly high strength characteristics at temperatures of up to or even above 900° C. The sheets 10 are brazed to one another and also at least in part to the housing 12 at least over part of the length of the catalyst carrier body 1. As seen in a circumferential direction 13, the housing 12 has a collar element 14, which extends all the way around perpendicular to an axis 8. The collar element 14 has two bores 33 which are used to fix the catalyst carrier body 1 in an exhaust system or to an internal combustion engine.

The sectional illustration of FIG. 1B reveals a conical shape of the catalyst carrier body 1, with the large inlet side 4 and a smaller outlet side 5. Passages 6 which run substantially parallel to one another and through which exhaust gas flows in a preferred flow direction 30, extend between the inlet side 4 and the outlet side 5. A maximum diameter 9 is greater than a length 7 of the catalyst carrier body 1 and of the passages 6, and consequently the ratio of length to diameter is less than 1.0.

FIGS. 2A and 2B are diagrammatic and perspective views of a portion of an embodiment of a catalytic converter 15. This catalytic converter 15 includes a catalyst carrier body 1, which is constructed by using smooth and corrugated metallic sheets 10. Passages 6, through which the exhaust gas flows in a flow direction 30, are formed between these smooth and corrugated sheets 10. The sheets 10 have a sheet thickness 11 which is, for example, in a range of from 40 μm to 65 μm.

The sheets 10 in this case are equipped with a device for maintaining and/or generating a turbulent flow of a gas stream through the passages 6. A microstructure 34, which swirls up partial-flows of exhaust gas, is formed in the smooth sheet 10. Microstructures 34 of this type preferably extend over only a small part of the passage height, in particular less than 50% of the passage height, and advantageously do not have any freely projecting guide vanes, but rather are formed as beads or indentations, etc. On one hand this ensures that the dynamic pressure upstream of a catalytic converter of this type does not greatly restrict or reduce the engine power. At the same time, relatively fine and unstable, protruding constituents (e.g. guide vanes) of the sheet 10 are prevented from becoming detached. Microstructures 34 of this type may be provided in the smooth and/or corrugated sheets 10. Equally, it is also possible for openings 35 in the (corrugated and/or smooth) sheets 10 to produce connections to adjacent passages, thereby making it possible to swirl up and/or intimately mix partial gas streams. The sheets 10 are completely provided with a coating 16.

The coating 16 is diagrammatically depicted in the enlarged illustration of FIG. 2B. The coating 16 includes a support substance 17, which has been applied directly to the sheet 10. The support substance 17, in particular a washcoat, has a very fissured surface and is generally porous. A mean layer thickness 18 of the support substance 17 is advantageously in a range of less than 30 μm. A catalyst substance 19, which is brought into intimate contact with the exhaust gas flowing past it, is disposed in the pores in the support substance 17 and/or on the surface. This produces the desired chemical reactions, in particular conversion of carbon monoxide.

FIG. 3 diagrammatically illustrates a structure of an exhaust system 2 which is connected downstream, for example, of an internal combustion engine 3 constructed as a diesel engine. Exhaust gases produced in the internal combustion engine 3 are combined through the use of a manifold 28 in order to then be jointly passed onward. A catalytic converter 15 is provided immediately following the manifold 28, with a distance 25 covered by the exhaust gas between leaving a combustion chamber in the interior of the internal combustion engine 3 and reaching the catalytic converter 15 being less than 50 cm. The catalytic converter 15 is predominantly responsible for converting carbon monoxide, while preferably allowing unburnt hydrocarbons to pass through it.

The exhaust gas then leaves the catalytic converter 15 and flows in the flow direction 30 to a branching point, which can be controlled by using a valve 32. This branching point is for a bypass line 31, in which a further possible position for a catalytic converter 15 is indicated in broken lines. The exhaust gas which does not flow through the bypass line 31 is fed to a first turbocharger 20. The exhaust gas which flows through the first turbocharger 20 thereby compresses air provided to the internal combustion engine 3 through the use of an air feed 29. The exhaust gas then flows onward in the flow direction 30 until it reaches a second turbocharger 20. A further possible position of a catalytic converter 15 downstream of an outlet of the bypass line and upstream of the second turbocharger 20, is indicated in broken lines.

After the whole of the exhaust-gas stream has then also flowed through the second turbocharger 20, it comes into contact with an adsorber 23, which is used for temporary storage of nitrogen oxides. The quantity of unburnt hydrocarbons which has not been converted in the catalytic converter 15 is now used to regenerate this adsorber 23 by virtue of the hydrocarbons being used to convert the nitrogen oxides and in the process being converted themselves. The exhaust gas can then be fed to further exhaust-gas treatment components.

Figure 4:
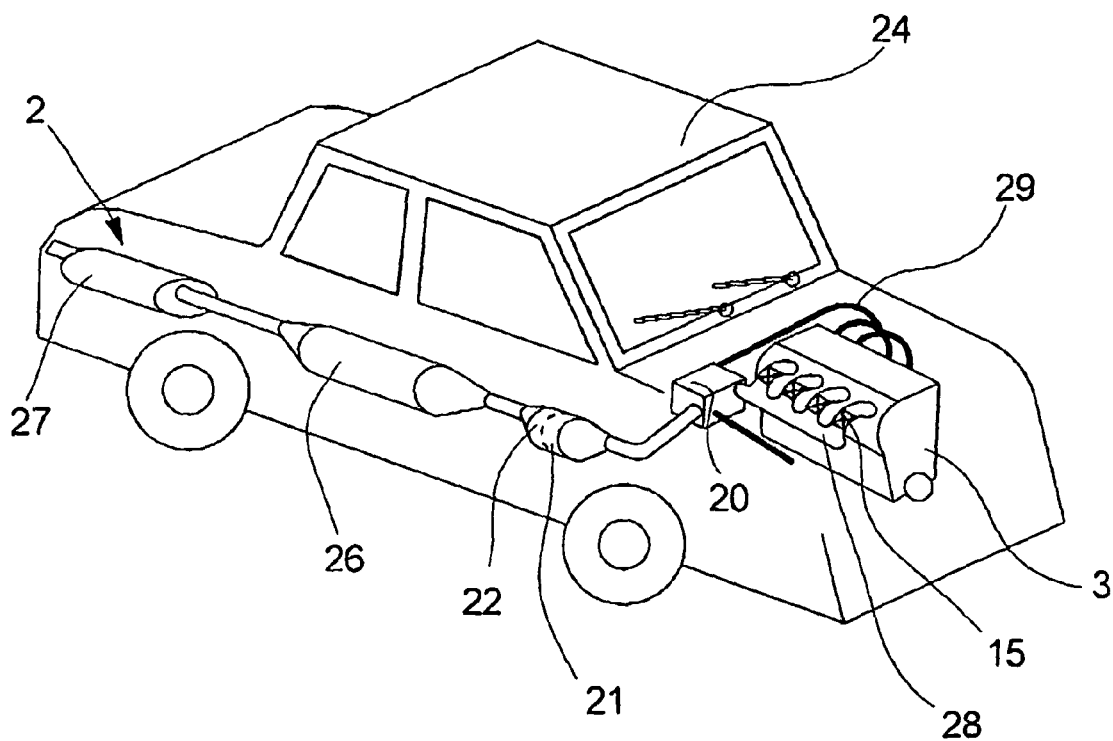
FIG. 4 is a perspective view of a vehicle with a further embodiment of an exhaust system.

FIG. 4 shows a diagrammatic and perspective view of a vehicle 24 having an internal combustion engine 3 and a corresponding exhaust system 2 for converting pollutants contained in the exhaust gas which is produced, before the exhaust gas is ultimately released to the atmosphere. The exhaust-gas stream is once again introduced into the exhaust system 2 through a manifold 28, with a catalytic converter 15 being provided in each individual manifold tube in the embodiment example illustrated therein. The exhaust gas then once again flows through a turbocharger 20, which is used to compress the air in the air feed or intake 29. Then, the exhaust gas is fed firstly to an oxidation catalytic converter 21 which, by way of example, effects combustion of unburnt hydrocarbons. This increases the exhaust-gas temperature, so that a particulate filter 22 connected immediately downstream is regenerated. This exhaust gas is then fed to a conventional three-way catalytic converter 26 and finally to a muffler 27 before ultimately leaving the exhaust system in purified form.

What is claimed is:

1. A welded or high temperature brazed catalyst carrier body for use in an exhaust system close to an internal combustion engine, the catalyst carrier body comprising:
an inlet side for a gas stream;
an outlet side for the gas stream;
at least one metallic sheet disposed between said inlet side and said outlet side, said at least one metallic sheet having a sheet thickness of at least 30 μm, said at least one metallic sheet having at least a proof stress $R_{p0.2}$ of 75 N/mm$^2$ at a temperature of 900° C., said at least one metallic sheet being formed of an iron material having nickel as a largest alloying constituent, said nickel alloying constituent being present in a range of from 30% by weight to 34% by weight, and a chromium alloying constituent being present in a range of from 18% by weight to 22% by weight;
a multiplicity of passages through which the gas stream can flow, said passages being formed by said at least one metallic sheet and extending next to one another between said inlet side and said outlet side; and
a device at least for maintaining or generating a turbulent flow of the gas stream through said passages.

2. The catalyst carrier body according to claim 1, which further comprises a length in axial direction, a maximum diameter, and a ratio of said length to said maximum diameter being at most 1.

3. The catalyst carrier body according to claim 1, wherein said passages have a passage density in a range of from 50 cpsi to 600 cpsi.

4. The catalyst carrier body according to claim 1, wherein said inlet side is larger than said outlet side.

5. The catalyst carrier body according to claim 1, which further comprises a housing having at least one collar element in circumferential direction.

6. A catalytic converter, comprising a catalyst carrier body according to claim 1, said catalyst carrier body having a catalytically active coating.

7. The catalytic converter according to claim 6, wherein said coating includes a support substance having a layer thickness in a range of from 10 μm to 30 μm.

8. The catalytic converter according to claim 6, wherein said coating includes a catalyst substance promoting conversion of CO but not converting HC.

9. The catalytic converter according to claim 7, wherein said coating includes a catalyst substance promoting conversion of CO but not converting HC.

10. An exhaust system for an internal combustion engine, the exhaust system comprising:
a turbocharger; and
a catalytic converter according to claim 6, said catalytic converter being disposed between the internal combustion engine and said turbocharger.

11. The exhaust system according to claim 10, which further comprises at least one exhaust-gas treatment component selected from the group consisting of an oxidation catalytic converter, a particulate filter, and a nitrogen oxide adsorber, said at least one exhaust-gas treatment component disposed downstream of said turbocharger.

12. A vehicle, comprising a catalytic converter according to claim 6.

13. A vehicle, comprising an exhaust system according to claim 10.

14. In a vehicle having an internal combustion engine with a combustion chamber, an exhaust system comprising:
a welded or high temperature brazed catalyst carrier body disposed at a distance of less than 50 cm from an exhaust of the combustion chamber, said catalyst carrier body having:
an inlet side for a gas stream;
an outlet side for the gas stream;
at least one metallic sheet having a sheet thickness of at least 30 μm, said metallic sheet disposed between said inlet side and said outlet side, said at least one metallic sheet having at least a proof stress $R_{p0.2}$ of 75 N/mm$^2$ at a temperature of 900° C., said at least one metallic sheet being formed of an iron material having nickel as a largest alloying constituent, said nickel alloying constituent being present in a range of from 30% by weight to 34% by weight, and a chromium alloying constituent being present in a range of from 18% by weight to 22% by weight;
a multiplicity of passages through which the gas stream can flow, said passages being formed by said at least one metallic sheet and extending next to one another between said inlet side and said outlet side; and
a device at least for maintaining or generating a turbulent flow of the gas stream through said passages.

* * * * *